April 17, 1951 J. H. TAYLOR 2,549,032
MACHINE FOR AND METHOD OF MAKING SPIRAL PIPES
Filed Nov. 19, 1948 5 Sheets-Sheet 1

INVENTOR.
James Hall Taylor
BY
Brown, Jackson, Boettcher & Dienner.
Att'ys

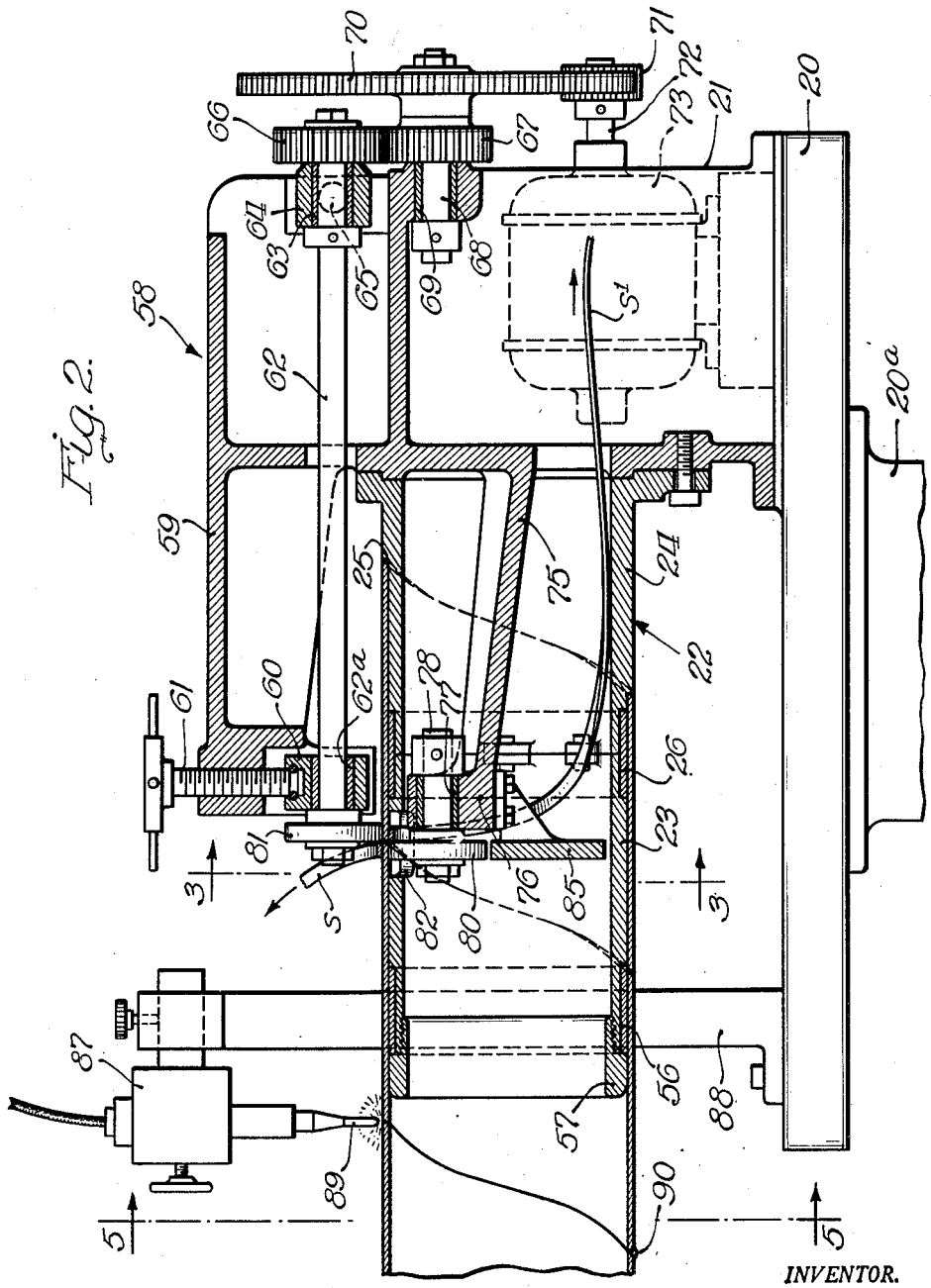

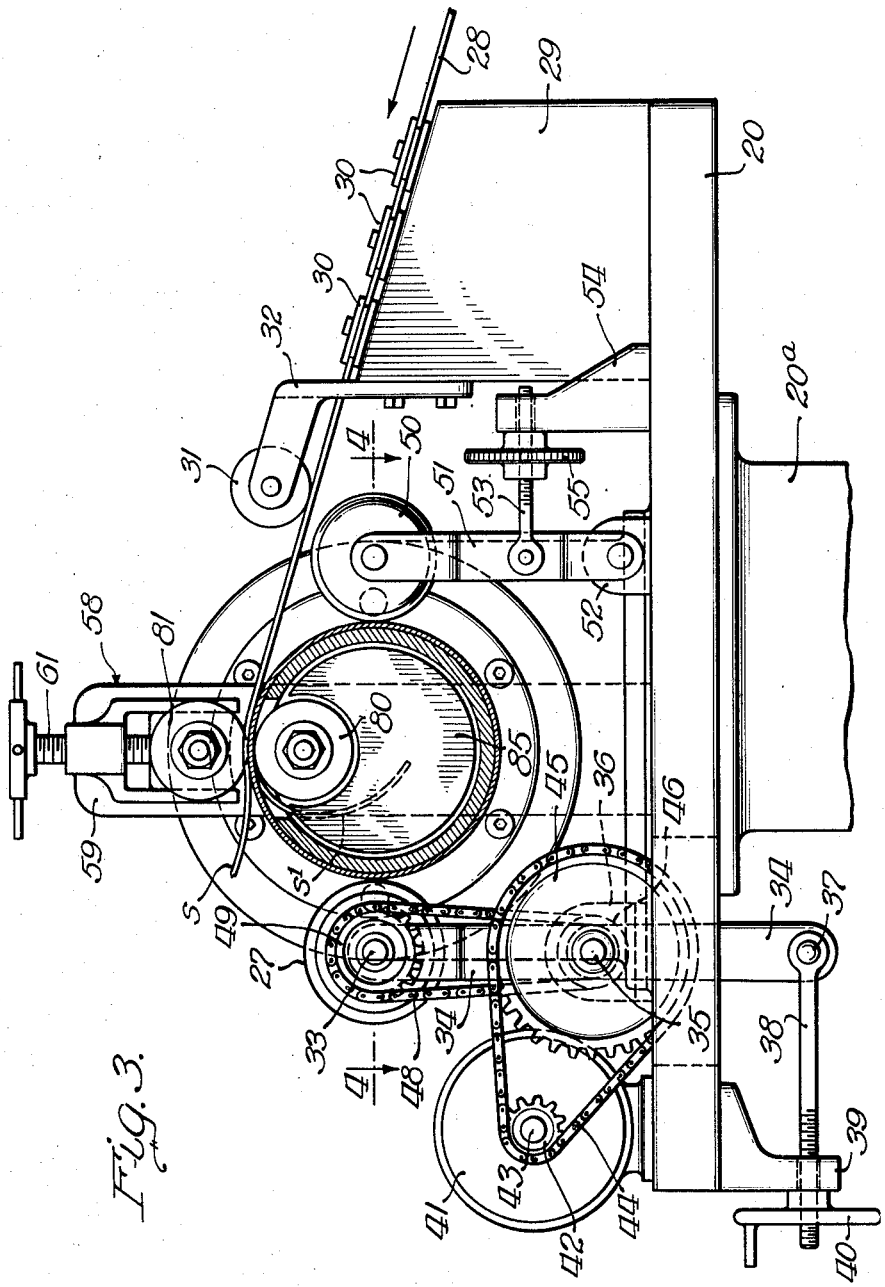

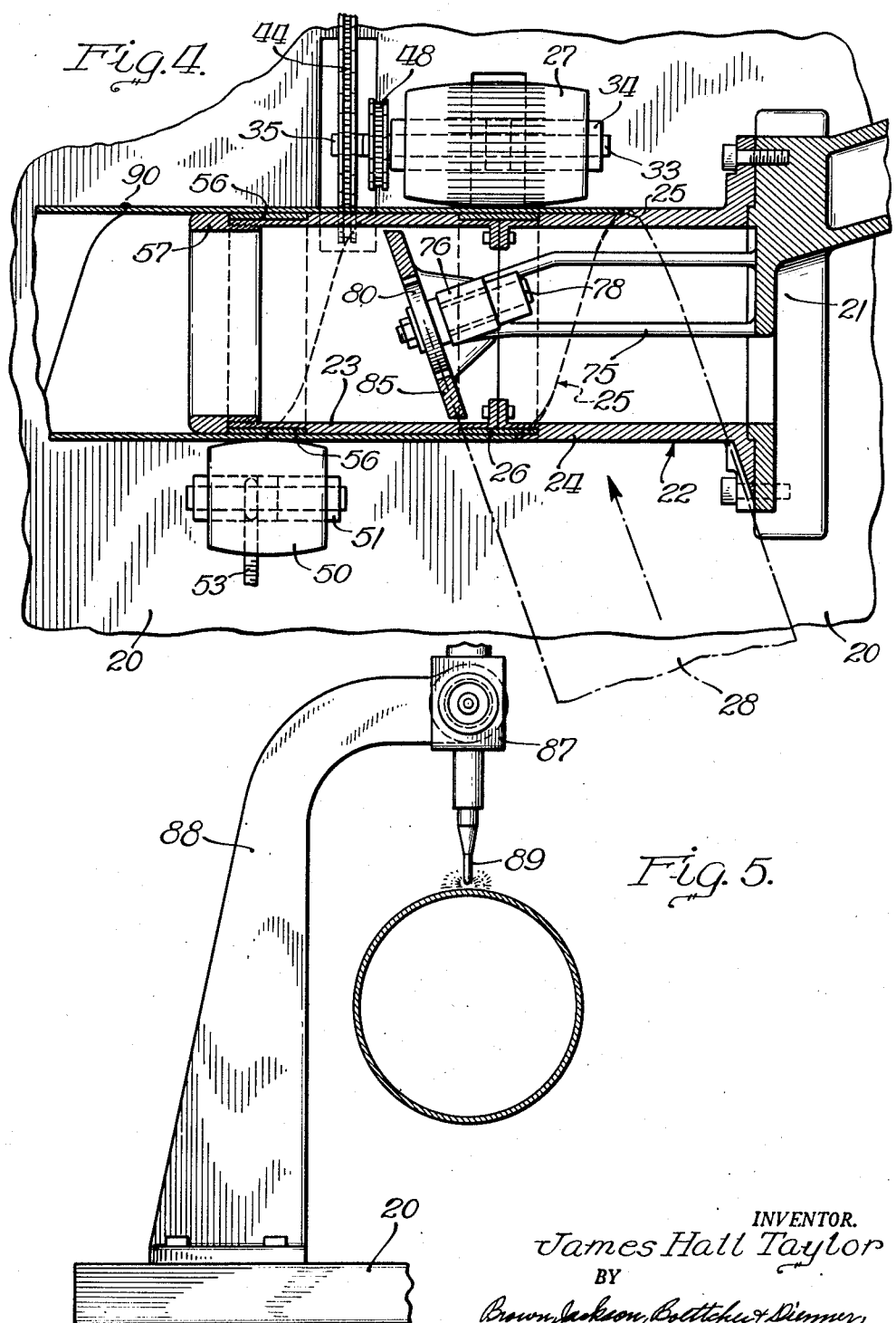

April 17, 1951      J. H. TAYLOR      2,549,032
MACHINE FOR AND METHOD OF MAKING SPIRAL PIPES
Filed Nov. 19, 1948      5 Sheets-Sheet 5
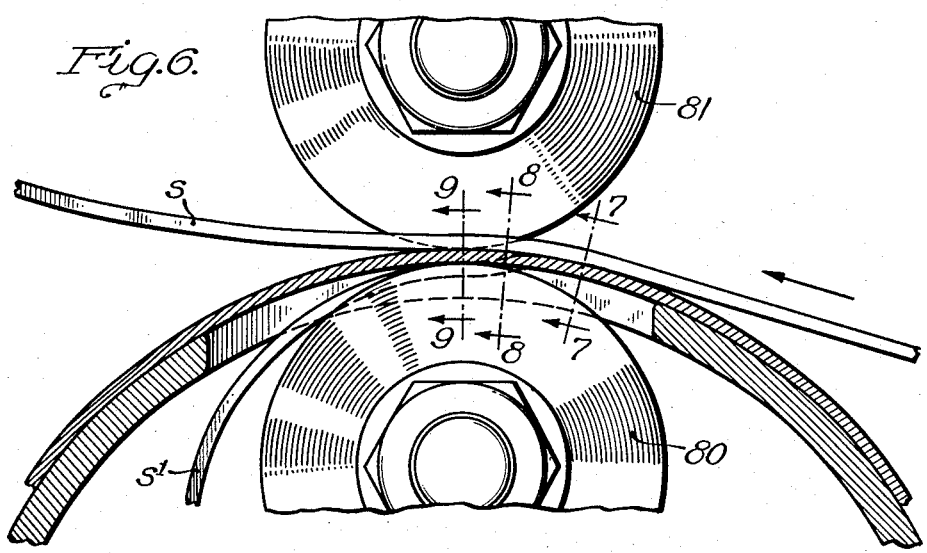
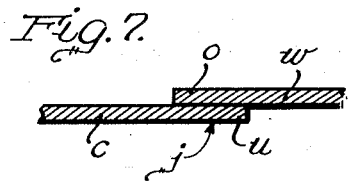
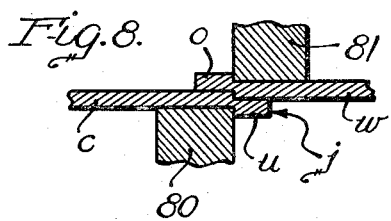
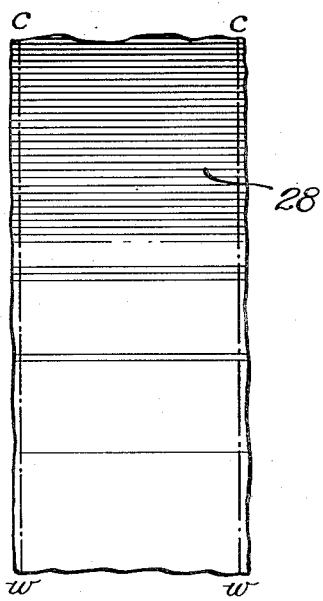
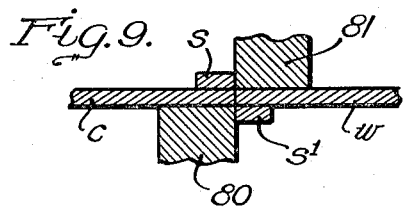
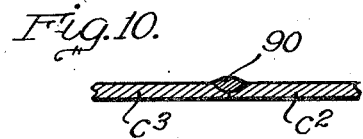
INVENTOR.
James Hall Taylor
BY
Brown, Jackson, Boettcher & Dienner,
Attys.

Patented Apr. 17, 1951

2,549,032

UNITED STATES PATENT OFFICE 2,549,032

MACHINE FOR AND METHOD OF MAKING SPIRAL PIPES

James Hall Taylor, Oak Park, Ill., assignor to Taylor Forge & Pipe Works, Chicago, Ill., a corporation of Illinois Application November 19, 1948, Serial No. 60,951

9 Claims. (Cl. 113—35)

This invention relates to the production of spiral pipe from metal strip wound spirally into tubular form with the convolutions of the resultant tube welded together, and has to do with a novel machine and method for the production of such pipe.

In the commercial production of metal strip or skelp used for making spiral pipe, it frequently happens that there is considerable variation in the width of the strip and the edges thereof are more or less undulatory. That renders it extremely difficult and often impracticable to secure the convolutions of the wound pipe together by butt welding, for which reason it is the common practice to wind the strip so as to provide a lap joint between the convolutions and to weld together the overlap and the underlap of such joint. That inevitably provides projections interiorly of the pipe which, in many instances, are objectionable.

My invention is directed to a machine and a method whereby spirally wound pipe may be produced from commercial metal strip with expedition and facility and at comparatively low cost. To that end, I provide a machine comprising a former upon which the metal strip is wound spirally into tubular form, and means for cutting the strip, as it is wound, to uniform width, in such manner that the cut edges of the strip are moved into pressure contact and are welded together in the advancement of the pipe as it is formed. More particularly, the metal strip is wound upon the former in such manner that the leading margin of the convolution being wound overlaps the following margin of the next preceding convolution so as to provide a lap joint therebetween; the overlap and the underlap of the joint thus produced are cut through in a common plane and the cut edges of the strip are brought into contact and, in the advancement of the formed pipe, are welded together. The method of my invention comprises, broadly, cutting the metal strip to uniform width as it is wound into tubular or pipe form, disposing the cut edges of the convolutions of the strip in contact and welding such edges together. More specifically, as the lap joint is cut through, the leading edge portion of the convolution being wound is moved substantially radially inward into alignment with the following edge portion of the next preceding wound convolution, the cut edges of the two convolutions are brought into pressure contact, and the cut edges of the convolutions of the pipe or tube are welded together in the advancement of the pipe as it is formed. Further objects and advantages of my invention will appear from the detail description.

In the drawings:

Figure 2 is a sectional view, on an enlarged scale, taken substantially on line 2—2 of Figure 1, certain parts being shown in elevation;

Figure 3 is a sectional view, taken substantially on line 3—3 of Figure 2, certain parts being shown in elevation;

Figure 4 is a sectional view taken substantially on line 4—4 of Figure 3, certain parts being shown in plan;

Figure 5 is a sectional view taken substantially on line 5—5 of Figure 2, certain parts being broken away;

Figure 6 is a fragmentary transverse vertical sectional view, on an enlarged scale, of the former and the metal strip being wound thereon, taken a short distance outward from the cutting discs of the shears, the discs being shown in elevation and partly broken away;

Figure 7 is a sectional view, taken substantially on line 7—7 of Figure 6, of the leading edge portion of a convolution of the metal strip being wound and the following edge portion of the next preceding convolution, showing the lap joint formed between the two convolutions during winding of a convolution, this view illustrating the first step of the method of my invention;

Figure 8 is a sectional view similar to Figure 7, but taken substantially on line 8—8 of Figure 6 and illustrating a further step in the method of my invention, in which the overlap and the underlap of the joint of Figure 7 are cut through in a common plane;

Figure 1:
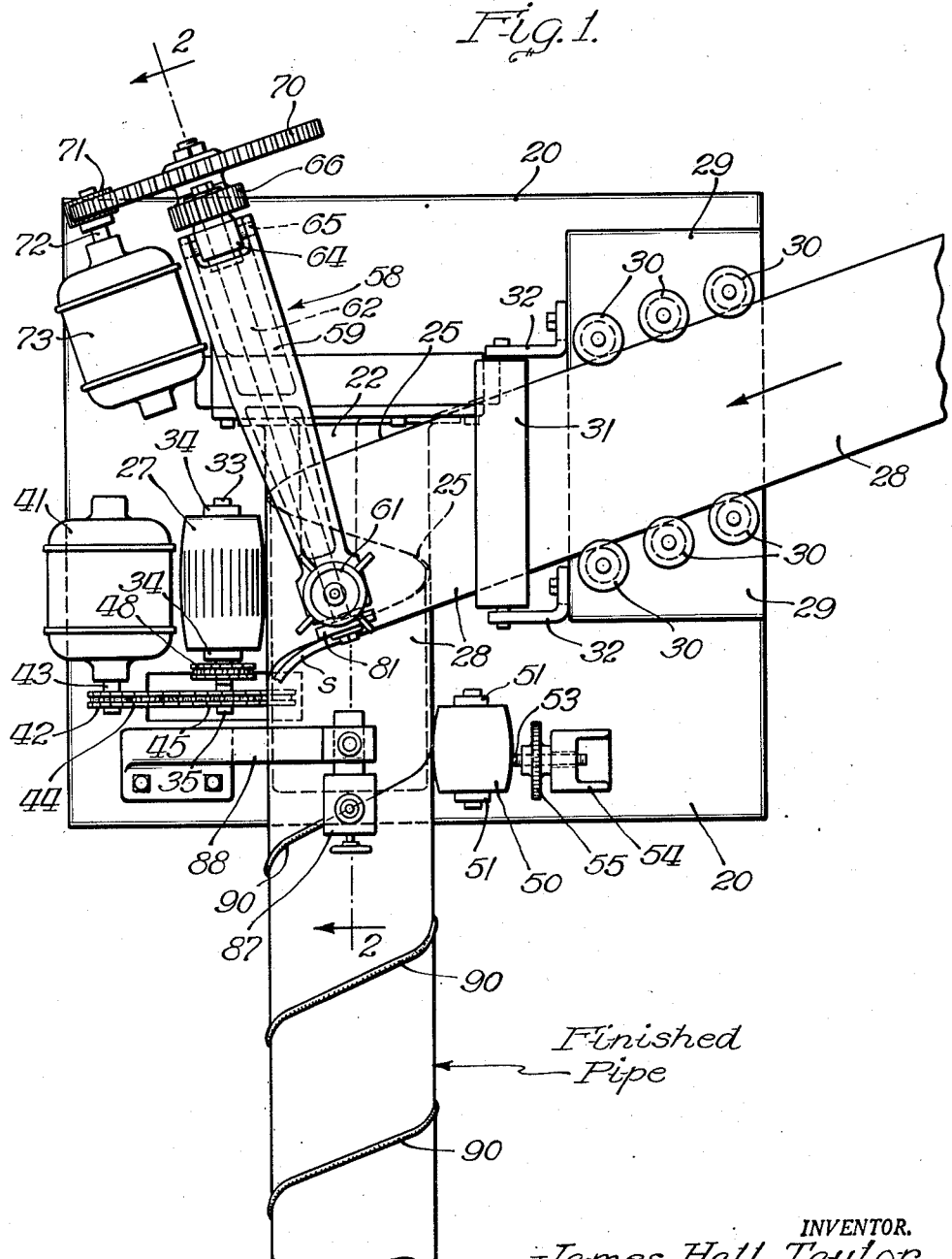
Figure 1 is a plan view, partly broken away, of a spiral pipe winding machine embodying my invention.

Figure 9 is a view similar to Figure 8, but taken substantially on line 9—9 of Figure 6 and illustrating a still further step of the method, in which the overlap and the underlap of the joint have been completely severed and the leading edge portion of the convolution being wound has been moved inward into alignment with the following edge portion of the next preceding wound convolution, and the cut edges of the two convolutions are in pressure contact with each other;

Figure 10 is a sectional view on the order of Figure 9, but illustrating the final step of the method of my invention, in which the cut edges of the convolutions are welded together; and Figure 11 is a face view of a length of commercial metal strip before trimming of the margins thereof in accordance with the method of my invention.

This application is a continuation-in-part of my application, Serial No. 32,447, filed June 11, 1948, which has been abandoned.

The machine of my invention comprises a base 20 mounted on a pedestal 20a, or otherwise suitably supported, and on which is suitably mounted a standard 21. A hollow cylindrical former 22 is suitably mounted on and bolted to the standard 21. Former 22 is shown as comprising two sleeves 23 and 24 bolted together end to end. The sleeve 24 is formed to provide an exterior helical shoulder 25 spaced a short distance from upright 21.

The adjacent ends of sleeves 23 and 24 (Figure 2) are recessed or rabbeted for reception of a ring 26 mounted thereon for free rotation. The metal strip or skelp 28 is gripped between ring 26 and a pinch roll 27, as will appear more fully presently. The skelp 28 passes over a table 29 mounted on base 20, between sets of circumferentially grooved guide rollers 30 mounted on table 29, and beneath an idler roll 31 mounted in brackets 32 secured to table 29. From roll 31 the skelp 28 passes upward to the former 22 and then downward about the latter, between ring 26 and the pinch roll 27. The latter roll 27 is fixed on a shaft 33 (Figures 1 and 3) rotatably mounted in the forked upper end of an arm 34 pivoted, at about its midlength, on a shaft 35 rotatably mounted in spaced bearing blocks, one of which is shown at 36, fixed to base 20. An eye rod 38 is pivoted, at 37, by pin and slot means, to the lower end of arm 34 and is threaded at its outer portion, which passes loosely through a bracket 39 fixed to, and extending downward from, base 20. A hand wheel 40 screws on rod 38 and bears against the outer face of bracket 39, for forcing pinch roll 27 toward ring 26, for gripping the skelp 28 therebetween. The roll 27 is shown as convexed lengthwise and serrated or ribbed at its midportion for gripping the skelp, though it may be otherwise suitably formed.

The pinch roll 27 is driven clockwise, as viewed in Figure 3, in a suitable manner. I have shown, by way of illustration, a chain and sprocket drive, from an electric motor 41 mounted on base 20 to pinch roll 27. A sprocket wheel 42, secured on motor shaft 43 receives a chain 44 passing about a sprocket wheel 45 secured on shaft 35. A second sprocket wheel 46, of greatly reduced diameter relative to sprocket wheel 45, is secured on shaft 35 and receives a chain 48 passing about a sprocket wheel 49 fixed on shaft 33. It will be seen that arm 34 may be adjusted about shaft 35 to desired extent without affecting the drive between motor 41 and pinch roll 27. The means shown for driving pinch roll 27 is by way of example only, and any suitable means may be provided for that purpose. Likewise, any suitable means may be provided for effecting adjustment of pinch roll 27 relative to ring 26. An idler pinch roll 50 is rotatably mounted, at the opposite side of former 22 from, and forwardly of, pinch roll 27, in the forked upper end of an arm 51, the lower forked end of which is pivoted to a boss 52 extending upward from base 20. An eye rod 53 is pivoted at its inner end, by pin and slot means, to arm 51 and its threaded outer portion passes loosely through a bracket 54 fixed to and extending upward from base 20. A hand wheel 55, screwing on rod 53 and bearing against the inner side of bracket 54, provides means for forcing roll 50 toward former 22. The outer end portion of sleeve 23 is recessed or rabbeted for reception of a ring 56 (Figure 2) freely rotatable thereon. This ring 56 is restrained against outward movement lengthwise of sleeve 23 by an end collar 57 threaded into sleeve 23 and having a shoulder constituting the outer end of the recess in which the ring 56 is mounted. The roll 50 is shown as convexed lengthwise, though it may be otherwise suitably formed, and is disposed for contact with the wound skelp passing over ring 56, at the leading and following edge portions of two adjacent convolutions thereof. The roll 50 may be mounted and adjusted in any suitable manner, the means shown for that purpose being illustrative only.

The metal strip or skelp 28 as it is produced commercially is of varying width and the edges of this strip are more or less sinuous or undulatory. In Figure 11 I have shown a short length of the metal strip or skelp 28 in face view, in the condition in which it is produced commercially, the undulations of the edges of the strip being somewhat exaggerated for purposes of illustration. It will be seen that there is considerable variation in the width of the strip and that if the skelp in this form were wound spirally with the edges of the strip abutting, it would not be possible to obtain proper edgewise contact between the convolutions of the wound strip so that they could be butt welded together. Accordingly, it is the usual practice to wind the skelp in such manner as to provide a lap joint of substantial width between adjacent convolutions and to secure the overlap and the underlap of the joint together by welding. The objections to that procedure have been pointed out above and need not be repeated here.

The standard 21 constitutes a part of a pair of rotary shears 58 comprising an upper arm 59 extending lengthwise of former 22 in overlying relation to the upper portion thereof. A journal block 60, shown more clearly in Figures 2 and 3, is slidably mounted for vertical movement in the inner end of arm 59. This block 60 is suitably connected to the lower end of an adjusting screw 61 threaded through the upper inner end portion of arm 59, for effecting adjustment of block 60. A shaft 62 is rotatably mounted, at its inner end portion, in a bushing 62a in block 60 and, at its outer end portion, in a bushing 63 in a block 64 pivoted, at 65, for swinging movement about a horizontal axis in the upper portion of upright 21. A spur gear 66 is keyed on the outer end of shaft 62 and meshes with a similar spur gear 67 keyed on a stub shaft 68 rotatably mounted in a bushing 69 carried by standard 21. Stub shaft 68 has keyed on its outer end, adjacent gear 67, a spur gear 70 of much greater diameter than gear 67. The spur gear 70 meshes with a pinion 71 secured on shaft 72 of an electric motor 73 mounted on base 20. It will be seen that when the motor 73 is in operation, the shaft 62 is driven at relatively low speed, the gears 66 and 67 being of the same diameter.

A lower arm 75 (Figures 2 and 4) extends from standard 21 into the former 22, through the adjacent open end thereof. Arm 75 is provided, at its inner end, with an upwardly extending bearing block 76 carrying a bearing bushing 77 in which a stub shaft 78 is rotatably mounted. A cutting disc 80 is suitably secured on the inner end of stub shaft 78 in cooperating relation to a cutting disc 81 secured on the inner end of shaft 62. The disc 80 extends into an opening 82 extending through the upper portion of the sleeve 28 of former 22. The cutting discs 80 and 81 are disposed at an inclination across the axis of former 22, at the upper portion thereof, as in Figures 1 and 4, and the inner face of disc 81 is disposed in a common plane with the outer face of disc 80. The disc 81 is the driven disc, and the disc 80 is an idler disc, as will be clear from the above; the two discs cooperating to cut through the overlap and the underlap of the lap joint between a convolution being wound and the next preceding wound convolution, as will be explained more fully later.

In the operation of the machine, the metal strip or skelp 28 is gripped between the pinch roll 27 and the ring 26 so as to be pulled thereby over and wound about the former 22, with its following edge in contact with the helical shoulder 25. From the driven pinch roll 27 the skelp 28 passes around former 22 to the idler pinch roll 50, between which and ring 56 it is gripped and thereby held wound upon former 22, on which the strip is wound spirally into tubular form, and the formed tube or pipe is advanced over the former lengthwise thereof as it is wound. During the winding of each convolution the leading margin thereof is wound over the following margin of the next preceding convolution, providing therewith a lap joint. That will be clear from Figure 7, in which the convolution being wound is indicated by the reference letter $w$ and the next preceding wound convolution is indicated by the reference letter $c$. The overlapping margins of the convolutions $w$ and $c$ provide a lap joint $j$ therebetween comprising the overlap $o$ and the underlap $u$. At the time that the machine is set into operation, the upper cutting disc 81 is in its operative or cutting position shown in Figures 2 and 6, the disc 81 being driven in such direction as to tend to pull the skelp 28 over the former, thereby assisting in the feed or delivery thereto of the skelp. The discs 80 and 81 of the shears are so disposed as to cut through the lap joint $j$ in the winding of the strip and the advancement of the wound convolutions along the former 22. As the lap joint $j$ enters between the discs 80 and 81, these discs cut through the joint at about the center line thereof, as shown in Figure 8. In the continued operation of the machine, the lap joint passes through the bite of the discs 80 and 81 and the overlap and the underlap of the joint are there cut completely through thereby severing a narrow strip $s$ of metal from the overlap and a narrow strip $s1$ of metal from the underlap, as indicated in Figure 9.

As the wound skelp is severed, the leading margin of the convolution being wound is moved radially inward, by disc 81, into contact with former 22 and into alignment with the following margin of the next preceding wound convolution. At that time, the following edge of the convolution $c$ is in alignment with the leading edge portion of the convolution $w$ being wound, as shown in Figure 9.

The strip or portion $s$ severed from the overlap $o$ is deflected upward and outward of the former 22 and, as it leaves the latter, may be disposed of in any suitable manner. A deflector 85, shown more clearly in Figures 2, 3 and 4, is mounted on the inner end of arm 75 and extends about the cutting disc 80. This deflector 85 deflects toward the adjacent open end of the former 22 the portion or strip $s1$ severed from the underlap of the lap joint between the convolution being wound and the next preceding convolution. This severed portion $s1$ of the underlap may be led through the adjacent end of the former and continuously delivered therethrough during operation of the machine, the severed portion or strip $s1$ being disposed of in any suitable manner.

The wound convolution of the metal strip, constituting the tubular member or pipe, are in contact with the outer surface of the former 22 under substantial pressure, presenting appreciable resistance to advancement of such wound convolutions along the former. As the metal strip or skelp is wound, with the following edge thereof in contact with shoulder 25 of the former 22, it is forced toward the end of the former remote from shoulder 25, thereby forcing along the former the previously wound convolutions. Accordingly, the cut edges of the convolutions wound upon the former are maintained in contact under substantial pressure.

An electrical welding head 87 (Figures 1, 2 and 5), of known type, is mounted on an angle bracket 88 secured to base 20 adjacent the outer open end of former 22. The head 87 is so disposed that a welding electrode 89 carried thereby is spaced but a short distance from the outer end of the former 22 and from pinch roll 50, and is positioned for welding the adjacent convolutions of the wound tubing or pipe along the line of edgewise contact between adjacent convolutions. As will be clear from what has been said, as the pipe or tube is wound, it is advanced axially along the former and is rotated about its axis, the contacting edges of the convolutions being welded together during winding and advancement of the pipe, so as to be united by the weld 90 shown in Figure 10. In this figure, the adjacent convolutions which are welded together are identified by the references $c2$ and $c3$.

In Figure 11 I have shown a face view of metal strip or skelp as it is produced commercially. It will be noted that the side edges of this strip are undulatory and that the strip varies in width. As previously explained, such metal strip is not suitable for production of spiral pipe in which the convolutions are wound in edgewise contact and secured together by butt welding. As the metal strip or skelp 28 passes between the cutting discs 80 and 81 of the machine, the margins of the strip are cut, in the manner above described, so that the cut edges thereof are straight and true. In Figure 11 the dot and dash lines $cw$ indicate the lines along which the skelp is cut as it is wound into tubular form to produce the pipe, and also indicate the edges of the cut strip. The advantages of that have been explained above and need not be repeated here.

As above indicated, and as will be understood by those skilled in this art, changes in detail may be resorted to, both as to the machine and the method of my invention, without departing from the field and scope thereof; and I intend to include all such variations, as fall within the appended claims, in this application in which the preferred form only of my invention has been disclosed.

I claim:

1. In a machine for making spiral pipe from metal strip, a cylindrical former having a helical shoulder, means for winding metal strip in contact with said shoulder and forming it on said former spirally into tubular form with the leading margin of each convolution as it is wound overlapping the following margin of the next preceding convolution, and cutting means effective for cutting through in a common plane the overlapping margins of said convolutions, said cutting means comprising two cooperating cutting members and one of said members extending into said former.

2. In a machine for making spiral pipe from metal strip, a cylindrical former having a helical shoulder, means for winding metal strip in contact with said shoulder and forming it on said former spirally into tubular form with the leading margin of each convolution as it is wound overlapping the following margin of the next preceding convolution, cutting means effective for cutting through in a common plane the overlapping margins of said convolutions, said cutting means comprising two cooperating cutting members and one of said members extending into said former, and means for discharging from said former the severed portions of said margins as they are cut.

3. In a machine for making spiral pipe from metal strip, a tubular cylindrical open ended former having a helical shoulder adjacent one end, means for winding metal strips in contact with said shoulder and forming it on said former spirally into tubular form with the leading margin of each convolution as it is wound overlapping the following margin of the next preceding convolution providing a lap joint therebetween, cutting means effective for cutting through in a common plane the overlapping margins of said convolutions, said cutting means comprising two cooperating cutting members and one of said members extending into said former, and deflector means within said former disposed to deflect through said one end thereof the severed portion of the underlap of said joint as it is cut.

4. In a machine for making spiral pipe from metal strip, a tubular cylindrical open ended former having an exterior helical shoulder adjacent one end, means for winding metal strip in contact with said shoulder and forming it on said former spirally into tubular form with the leading margin of each convolution as it is wound overlapping the following margin of the next preceding convolution providing a lap joint therebetween, said former being provided with a substantially radial opening, and shears comprising an arm extending into said former through said one end thereof and two cutting members, one carried by said arm and the other contiguous to said opening, effective for cutting through in a common plane the overlapping margins of said convolutions.

5. In a machine for making spiral pipe from metal strip, a tubular cylindrical open ended former having an exterior helical shoulder adjacent one end, means for winding metal strip in contact with said shoulder and forming it on said former spirally into tubular form with the leading margin of each convolution as it is wound overlapping the following margin of the next preceding convolution providing a lap joint therebetween, said former having at its upper portion an opening therethrough, shears comprising a lower arm extending into said former through said one end thereof and an upper arm overlying said former, and cooperating cutting members carried by said arms respectively disposed adjacent said former and in said opening effective for cutting through in a common plane the overlapping margins of said convolutions.

6. In a machine for making spiral pipe from metal strip, a tubular cylindrical opened ended former having an exterior helical shoulder adjacent one end, means for winding metal strip in contact with said shoulder and forming it on said form spirally into tubular form with the leading margin of each convolution as it is wound overlapping the following margin of the next preceding convolution providing a lap joint therebetween, said former being provided with a substantially radial opening, shears comprising an arm extending into said former through said one end thereof and an arm exterior of said former, two cutting discs respectively mounted for rotation on said arms inclined across the axis of said former, one of said discs being within said former and the other disc extending adjacent said opening, said discs cooperating for cutting through in a common plane the overlapping margins of said convolutions, and power means for driving one of said discs in a direction tending to wind the metal strip about said former.

7. In a machine for making spiral pipe from metal strip, a tubular cylindrical open ended former having an exterior helical shoulder adjacent one end, means for winding metal strip in contact with said shoulder and forming it on said former spirally into tubular form with the leading margin of each convolution as it is wound overlapping the following margin of the next preceding convolution providing a lap joint therebetween, said former being provided with a substantially radial opening, shears comprising an arm extending into said former through said one end thereof and two cutting members, one carried by said arm and the other contiguous to said opening, effective for cutting through in a common plane the overlapping margins for said convolutions, and a deflector carried by said arm disposed to deflect the severed portion of the underlap of said joint toward said one end of said former.

8. The method of making spiral pipe, which comprises winding metal strip spirally into tubular form with the margins of adjacent convolutions of the wound strip overlapping, cutting through the overlapping margins, and welding together the cut edges of the convolutions.

9. The method of making spiral pipe, which comprises winding metal strip spirally into tubular form with the leading margin of each convolution as it is wound overlapping the following margin of the next preceding convolution, cutting through the overlapping margins and moving the cut leading edge portion of the convolution being wound radially inward into alignment with the cut edge of the next preceding wound convolution in edgewise contact therewith, and welding together the cut edges of the convolutions.

JAMES HALL TAYLOR.

REFERENCES CITED

The following references are of record in the file of this patent:

UNITED STATES PATENTS

| Number | Name | Date |
|---|---|---|
| 183,328 | Root | Oct. 17, 1876 |
| 1,583,212 | Williams | May 4, 1926 |
| 1,793,280 | Williams | Feb. 17, 1931 |
| 1,989,796 | Firth | Feb. 5, 1935 |
| 2,063,798 | Firth | Dec. 8, 1936 |
| 2,155,859 | Harford | Apr. 25, 1939 |
| 2,237,309 | McMinn | Apr. 8, 1941 |
| 2,265,129 | Darner | Dec. 9, 1941 |
| 2,316,349 | McMinn | Apr. 13, 1943 |

FOREIGN PATENTS

| Number | Country | Date |
|---|---|---|
| 110,210 | Australia | Mar. 21, 1940 |